No. 742,701. PATENTED OCT. 27, 1903.
F. MAUSSNER.
REVERSIBLE PAD FOR SADDLES, COLLARS, &c.
APPLICATION FILED DEC. 27, 1902.
NO MODEL.
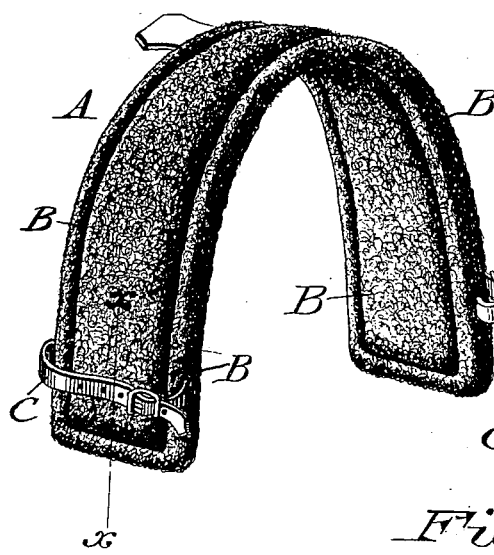
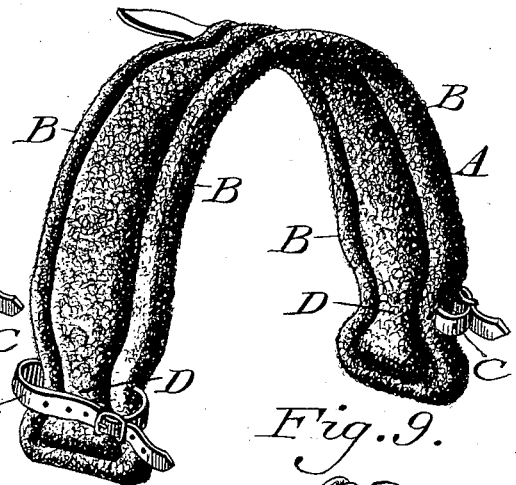
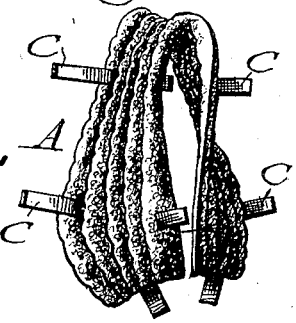
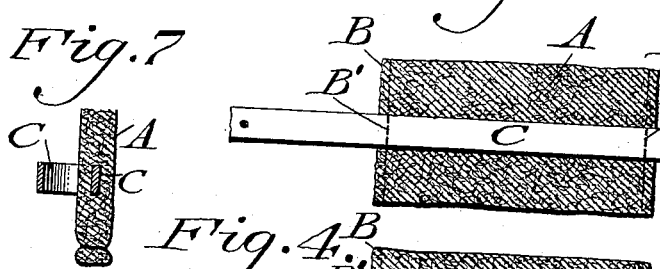
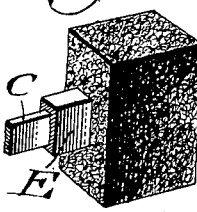
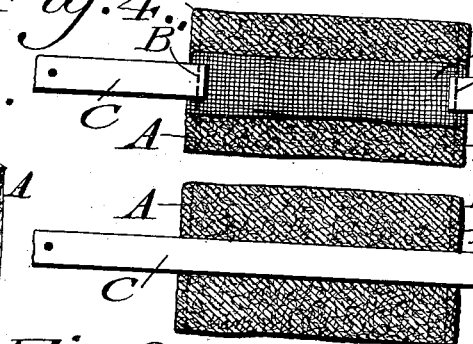
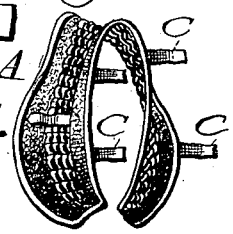
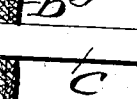
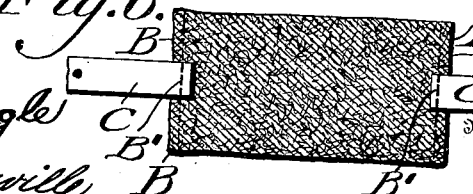
Witnesses:
P. H. Nagle
L. Bouville.
Inventor:
Friedrich Maussner,
By Diedersheim & Fairbanks,
Attorneys.

No. 742,701.

Patented October 27, 1903.

UNITED STATES PATENT OFFICE.

FRIEDRICH MAUSSNER, OF PHILADELPHIA, PENNSYLVANIA, ASSIGNOR TO AMERICAN INTERLACED HORSE COLLAR COMPANY, A CORPORATION OF NEW JERSEY.

REVERSIBLE PAD FOR SADDLES, COLLARS, &c.

SPECIFICATION forming part of Letters Patent No. 742,701, dated October 27, 1903.

Application filed December 27, 1902. Serial No. 136,808. (No model.)

*To all whom it may concern:*

Be it known that I, FRIEDRICH MAUSSNER, a subject of the Emperor of Germany, (but having resided in the United States over one year last past and having declared my intention of becoming a citizen thereof,) residing in the city and county of Philadelphia, State of Pennsylvania, have invented new and useful Improvements in Reversible Pads for Saddles, Collars, &c., of which the following is a specification.

My invention consists of an improvement in a pad for a saddle, collar, &c., whereby it is rendered reversible and the straps or means for attaching the same in position are prevented from coming in contact with the animal, and other advantages are presented, as will be hereinafter described.

Figures 1, 2, 9, and 10 represent perspective views of reversible pads embodying my invention. Figs. 3, 4, 5, and 6 represent sectional views of portions of pads, showing various ways of securing the attaching means in position. Fig. 7 represents a section of a portion on line $xx$, Fig. 1. Fig. 8 represents a perspective view of a detached portion, showing a lining for the straps employed.

Similar letters of reference indicate corresponding parts in the figures.

Referring to the drawings, A designates a pad having a body composed of a mass of interlooped vegetable or animal or any other suitable fibers.

In order to strengthen the edge portions of the pad and prevent disintegration of the same, they are bound by stitches B, which pass through the same in longitudinal and transverse directions.

The faces of the pad are uniform, so that the pad may be reversed and either face come in contact with the animal, whereby rubbing, chafing, or otherwise injuring the animal may be obviated.

C designates straps which are passed through the body of the pad and provided with buckles for securing purposes. In order to prevent shifting of said straps, the stitches B are continued through the adjacent portions of the said straps, as at B'. The portions of the straps that enter the mass of fiber are thus embedded therein, leaving the material of said interlooped fibers on the opposite sides of uniform nature. If desired, the straps may be divided, as in Fig. 6, or the inner ends of the straps when so divided may be connected with the piece E of canvas or other suitable material, as in Fig. 4, the straps, however, being connected with the pad by means of stitches which are continuous of the stitches B as in the other figures.

In Fig. 2 the lower ends of the pads have thereon reduced necks D, adapting the pad to articles of different widths, since the straps which pass through the necks can accommodate themselves to such articles.

In Fig. 8 I show a tube E' made of metal, leather, or cloth of any nature inserted in the pad or mass as a sheath for the straps or fastening devices, whereby the latter may be removed, renewed, or changed by drawing the same out of the said channel and inserting other straps or fastening devices.

In Figs. 9 and 10 I show the pad cut or reduced in suitable places, adapting the same to collars or articles of different widths and sizes, since the straps which passed through said pad can accommodate themselves to such articles.

By making the pad, as shown, of an open interlooped mass of fibrous material, as hair or the like, either side may be applied indifferently to the animal's skin. At the same time the pad is always permeable to air-currents and will carry off and quickly evaporate all perspiration.

Having thus described my invention, what I claim as new, and desire to secure by Letters Patent, is—

1. A reversible ventilating harness-pad both sides of which are alike, said pad comprising an open interlooped mass of fibrous material and fastening devices for securing it to a portion of a harness.

2. A reversible ventilating-pad both sides of which are alike, said pad comprising an open interlooped mass of fibrous material and fastening devices embedded therein and extending from the edges thereof.

3. A reversible ventilating-pad comprising an integral mass of fibrous material and fastening devices extending from the edges thereof, both sides of said pad presenting similar unbroken fibrous surfaces.

4. A reversible ventilating-pad formed of a mass of fibrous material having embedded therein a transverse sheath adapted to inclose a strap which extends from the edges thereof, both sides of said pad presenting similar unbroken fibrous surfaces.

FRIEDRICH MAUSSNER.

Witnesses:
  JOHN A. WIEDERSHEIM,
  S. R. CARR.